G. SEYFANG.
Bird-Cages.

No. 203,657. Patented May 14, 1878.

Witnesses:
Frank Hirsch.
Chas. Rosart

Inventor:
Geo. Seyfang,
by Michael J. Stark
atty.

UNITED STATES PATENT OFFICE.

GEORGE SEYFANG, OF BUFFALO, NEW YORK, ASSIGNOR TO GEORGE N. PIERCE, OF SAME PLACE.

IMPROVEMENT IN BIRD-CAGES.

Specification forming part of Letters Patent No. 203,657, dated May 14, 1878; application filed April 5, 1878.

*To all whom it may concern:*

Be it known that I, GEORGE SEYFANG, of Buffalo, in the county of Erie and State of New York, have invented certain new and useful Improvements on a Bird-Cage; and I do hereby declare that the following description of my said invention, taken in connection with the accompanying sheet of drawings, forms a full, clear, and exact specification, which will enable others skilled in the art to which it appertains to make and use the same.

This invention has special reference to bird-cages; and it consists in the peculiar arrangement of parts and details of construction, as hereinafter first fully set forth and described, and then pointed out in the claims.

Figure 1:
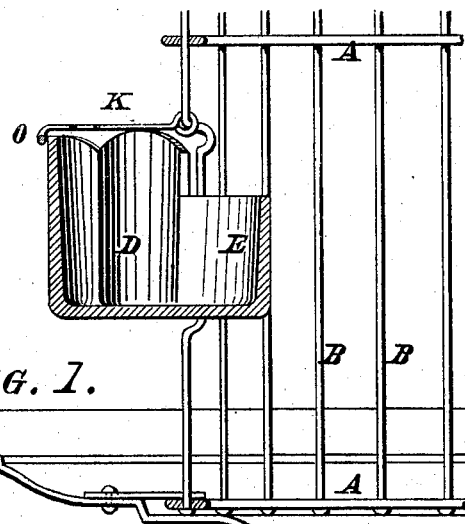
Figure 2:
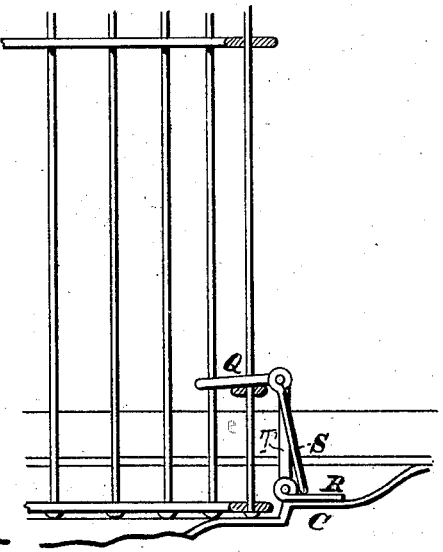
Figure 3:
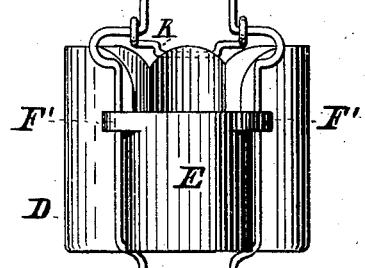
Figures 5, 6:
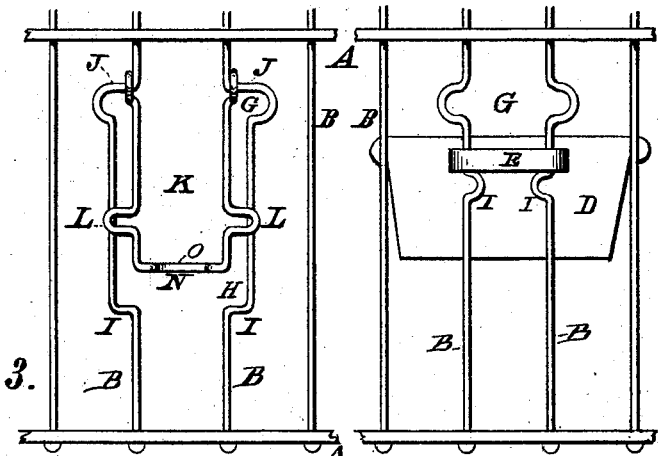
Figure 4:
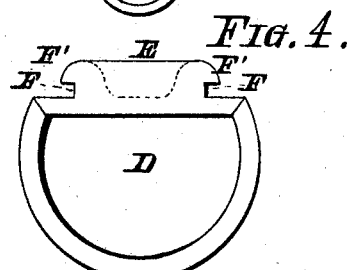
Figure 7:
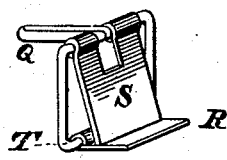
Figures 8, 9:
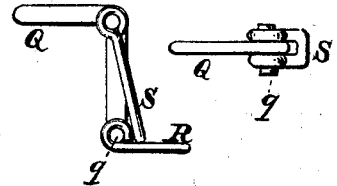

In the drawings hereinbefore mentioned, Figure 1 is a longitudinal sectional elevation of a portion of a bird-cage. Fig. 2 is a rear view of the food-cup and adjacent portions of the cage-wires. Fig. 3 is a plan of the food-cup. Fig. 4 is a like view of a cup slightly modified. Fig. 5 is a front elevation of that part of a cage retaining the food-cup in position. Fig. 6 is a rear elevation of the same. Figs. 7, 8, and 9 are detached views of the cage-hook.

Like letters of reference indicate corresponding or similar parts in all the figures.

A A are the horizontal bands, and B B the filling-wires, of a cage. C is the bottom. D is one of the food-cups. This cup has a projecting part, E, provided with oppositely-located notches F F, the part E between said notches being arranged to somewhat exceed the space between the filling-wires B B. These wires are at suitable places bent in opposite directions to form the enlargements G and H, Fig. 5, said enlargement G being of such a size as to enable the passage of the notched lugs F' on the food-cup D, while the enlargement H admits the part of said projection E between the notches F. By thus constructing the food-cup and arranging the filling-wires said cup can be secured to the cage by passing notched lugs F' F' into the space G, and then pushing it downward into the space H, when the notched lugs F' F' will clamp the said cup onto the filling-wires, said cup being arranged to rest upon the bends I in said filling-wires.

The food-cup illustrated in Figs. 1, 2, and 3 has the projection E forming a part of the food-receptacle, it being made hollow, and thus brings the feed-opening into the interior of the cage, it being placed between the filling-wires from the exterior. In some cases it is, however, desirable to keep the food-cup entirely on the outside of the cage. In this case I shall provide a cup of any desirable pattern with a projection, E, as depicted in Figs. 4 and 6, which, in point of construction and attachment, as will be readily seen, does not vary from that hereinbefore described, except that said projection does not form a part of the food-receptacle proper, but is simply a solid projecting part.

Owing to the width of the projection E across the notches F F, which, as hereinbefore described, forms a part of the food-receptacle, the filling-wires B B, between which the food-cup is passed, have to be bent considerably out of shape to form the enlargement H, and leave, therefore, after the food-cup is removed, a large opening in the cage, through which the bird might easily effect an escape. To avoid this, and at the same time to furnish a metallic means for additionally holding the cup to the cage-body, (the notched lugs F' F' on the cup D, which is made usually of glass, being very fragile,) I have hinged onto the upper bar J J of the enlargement G a flap, K, Figs. 1, 2, and 5, made of either sheet metal or wire. If made of the latter material, it should preferably be made between the parallel bars of a width corresponding to that of the filling-wires to form continuations therefor, as shown in Fig. 5, and provided with projections L to prevent it from being pushed into the cage, said projections L coming to a stop on the filling-wires B. Near the cross-bar N said flap K is bent at or nearly at right angles, as illustrated at O, Fig. 1, and K, Fig. 2, which downwardly-bent part overlaps the upper edge of the food-cup D, and thus serves as a brace to hold the cup to the cage-body.

It is evident that this flap may be of any desired design as long as it has the bent O to catch on the food-cup, and it may be made of sheet metal to represent butterflies, birds, eagles, &c., in which case such flap would serve the additional purpose of a cover to prevent the bird from scattering the food.

The cage-body is held to the bottom C by means of one or more self-locking hooks, consisting, essentially, of the hook proper, Q, hinged to the plate R, and the locking-flap S pivoted to the hook Q on the upper end. This flap is of such a length that when the upright part of the hook Q is in a vertical position said flap will just rest upon the plate R close to the hinge-joint T. If one would now try to bring the hook backward, said flap would, by acting as a brace, prevent such a movement, and, in order to enable the hook being disengaged, the flap S must be taken hold of, when, by pushing on the same, the said hook will readily follow, and thus release the cage-body.

In engaging the hook with the cage the said flap S will, by its own gravity, assume its proper position, (shown in Fig. 1,) and thus automatically lock said hook in position.

The hook Q and its accessories may be made in various ways, either of tin-plate and wire, as shown in Fig. 7, or of wire, and the hook Q of cast-iron, with the pivots $q$ cast onto the hook proper, said parts R and S having eyes on both extremities passing over the said pivots $q$, all as shown in Figs. 8 and 9.

It will be observed that the food-cup D rests upon the projection I. In case the food-cup is placed very near the bottom band such projection may be dispensed with and the cup arranged to rest upon the bottom band. So may the projection I, instead of being outwardly bent, as shown in Fig. 5, be inwardly formed, as illustrated in Fig. 6, and in case the food-cup is constructed as that shown in Figs. 4 and 6 the enlargement H may be dispensed with by making the distance between the notches F F to correspond with that between the filling-wires.

Having thus fully described my invention, I claim as new and desire to secure to me by Letters Patent of the United States—

1. The combination, with the base C and body A B, of the self-locking hook herein described, consisting, essentially, of the hook proper, Q, hinged to the part R, and the flap S, pivoted to said hook Q, and arranged to operate in conjunction therewith, substantially in the manner as and for the purpose specified.

2. The combination, with the filling-wires B, having the enlargements G and the projections I, of the cup D, provided with the projection E, having the notched lugs F' F', as and for the object stated.

3. In a bird-cage, a flap having a projecting ledge arranged to engage the food-cup D, said flap being pivoted to the bars J J of the filling-wires B B, and arranged to automatically close the space for the food-cups, as and for the purpose specified.

4. In a bird-cage, a flap, K, pivoted to the cage-body above the food-cup opening, and provided with a downwardly-bent projection or ledge engaging the upper edge of said cup, substantially in the manner and for the use and purpose specified.

In testimony that I claim the foregoing as my invention I have hereto set my hand and affixed my seal in the presence of two subscribing witnesses.

GEO. SEYFANG. [L. S.]

Attest:
MICHAEL J. STARK,
FRANK HIRSCH.